United States Patent
Lee

(10) Patent No.: US 12,429,356 B2
(45) Date of Patent: Sep. 30, 2025

(54) DRIVING INFORMATION PROVIDING METHOD, AND VEHICLE MAP PROVIDING SERVER AND METHOD

(71) Applicant: SK TELECOM CO., LTD., Seoul (KR)

(72) Inventor: Seongsoo Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 370 days.

(21) Appl. No.: 17/394,819

(22) Filed: Aug. 5, 2021

(65) Prior Publication Data

US 2021/0364321 A1    Nov. 25, 2021

Related U.S. Application Data

(63) Continuation-in-part of application No. PCT/KR2020/002426, filed on Feb. 19, 2020.

(30) Foreign Application Priority Data

Feb. 19, 2019 (KR) .................. 10-2019-0019488
Jun. 13, 2019 (KR) .................. 10-2019-0069873

(51) Int. Cl.
G06V 20/58 (2022.01)
G01C 21/00 (2006.01)
G06F 18/214 (2023.01)

(52) U.S. Cl.
CPC ....... *G01C 21/3841* (2020.08); *G01C 21/387* (2020.08); *G01C 21/3896* (2020.08); *G06F 18/214* (2023.01); *G06V 20/58* (2022.01)

(58) Field of Classification Search
CPC ............. G01C 21/3841; G01C 21/387; G01C 21/3896; G06V 20/58; G06F 18/214

(Continued)

(56) References Cited

U.S. PATENT DOCUMENTS 10,437,252 B1 * 10/2019 Liu .................. G01C 21/3878
10,671,876 B1 *  6/2020 Smith ................... G06V 20/63

(Continued)

FOREIGN PATENT DOCUMENTS

CN    105711597 A     6/2016
EP      3002708 A1 *  4/2016   ......... G06K 9/00805

(Continued)

OTHER PUBLICATIONS

Xingcheng Luo, A Deep Convolution Neural Network Model for Vehicle Recognition and Face Recognition, 2017, Elsevier, 7th International Congress of Information and Communication Technology (Year: 2017).*

(Continued)

*Primary Examiner* — Matthias S Weisfeld
(74) *Attorney, Agent, or Firm* — WTA Patents

(57) ABSTRACT

In accordance with an aspect of the present disclosure, there is provided a vehicle map providing method performed by a vehicle map providing server, comprising: receiving, from a first vehicle, first information including second driving information of a second vehicle on the first image; receiving, from a third vehicle, second information including fourth driving information of a fourth vehicle on the second image; generating, according to whether the second vehicle is the same as the fourth vehicle, a vehicle map by using the first information and the second information; predicting, from the vehicle map, a first vehicle map including driving information for one or more vehicles on a route of the first vehicle at a current time based on the first driving information; and transmitting the first vehicle map to the first vehicle.

12 Claims, 16 Drawing Sheets

(58) Field of Classification Search
USPC .......................................................... 701/532
See application file for complete search history.

(56) References Cited

U.S. PATENT DOCUMENTS

| | | | | |
|---|---|---|---|---|
| 2017/0076605 | A1* | 3/2017 | Suzuki | G08G 1/133 |
| 2017/0169711 | A1* | 6/2017 | Baek | G08G 1/166 |
| 2019/0139403 | A1* | 5/2019 | Alam | G08G 1/0112 |
| 2019/0220678 | A1* | 7/2019 | Guo | G06T 7/73 |
| 2020/0200905 | A1* | 6/2020 | Lee | G01S 17/58 |

FOREIGN PATENT DOCUMENTS

| | | |
|---|---|---|
| KR | 10-2016-0050873 A | 5/2016 |
| KR | 10-2016-0056129 A | 5/2016 |
| KR | 10-2016-0116727 A | 10/2016 |
| KR | 10-2016-0143304 A | 12/2016 |
| KR | 10-2017-0007961 A | 1/2017 |
| KR | 2017-0070395 A | 6/2017 |
| KR | 10-2017-0081920 A | 7/2017 |

OTHER PUBLICATIONS

Xingcheng Luo, A Deep Convolutional Neural Network Model for Vehicle Recognition and Face Recognition, 2017, Elsevier, 7th International Congress of Information and Communication Technology (Year: 2017).*

Abdullah Asim Yilmaz, A Vehicle Detection Approach using Deep Learning Methodologies, Jun. 2018, Conference: II. International Conference on Theoretical and Applied Computer Science and Engineering (Year: 2018).*

Office Action in Chinese Application No. 202080015561.2 dated Feb. 3, 2023 and English translation.

PCT International Search Report, PCT Application No. PCT/KR2020/002426, Jun. 11, 2020, five pages.

Office Action in Korean Patent Application No. 10-2019-0019488 dated Jul. 17, 2024 and English translation.

Office action of the corresponding Korean Patent Application No. 10-2019-0069873 mailed on Sep. 18, 2024.

* cited by examiner

DRIVING INFORMATION PROVIDING METHOD, AND VEHICLE MAP PROVIDING SERVER AND METHOD

CROSS-REFERENCE TO RELATED APPLICATIONS

This application is a bypass continuation application of PCT/KR2020/002426, filed on Feb. 19, 2020, which claims priority to Republic of Korea patent application No. 10-2019-0019488, filed on Feb. 19, 2019 and Republic of Korea patent application No. 10-2019-0069873, filed on Jun. 13, 2019, which are incorporated by reference herein in their entirety.

TECHNICAL FIELD

The present disclosure relates to a driving information providing method, a vehicle map providing server and a vehicle map providing method.

BACKGROUND

Cooperative-Intelligent Transport Systems (C-ITS) refers to a system that provides, in real time, information on surrounding traffic conditions and information on the accidental danger such as sudden stops and falling objects to the driver while driving a vehicle.

C-ITS aims to prevent traffic accidents in advance or to drastically reduce the traffic accidents. In order to achieve this purpose, the position of surrounding vehicles should be identified in real time, and one of the methods thereof is to determine the position of surrounding vehicles through continuous data sharing by vehicle-to-vehicle (V2V) and vehicle-to-road (infrastructure) (V2I).

However, in this method, it is difficult to determine the position of surrounding vehicles that do not support the V2V communication or the V2I communication. In addition, if a communication delay occurs, its performance may drop sharply.

SUMMARY

The problem to be solved by the present disclosure is to identify, in real time, a position of a surrounding vehicle that does not support V2V communication or V2I communication and provide it to a vehicle, and thereby more effectively providing a driving assistance service such as C-ITS to the vehicle or a driver of the vehicle.

In accordance with an aspect of the present disclosure, there is provided a vehicle map providing method performed by a vehicle map providing server, comprising: receiving, from a first vehicle, first information including a first image captured by the first vehicle, first driving information of the first vehicle, second driving information of a second vehicle on the first image; receiving, from a third vehicle, second information including a second image captured by the third vehicle, third driving information of the third vehicle, fourth driving information of a fourth vehicle on the second image; determining whether the second vehicle is the same as the fourth vehicle by using pre-stored vehicle map information, or the first information and the second information; generating, according to whether the second vehicle is the same as the fourth vehicle, a vehicle map by using the first driving information and the third driving information, and at least one of the second driving information and the fourth driving information; predicting, from the vehicle map, a first vehicle map including driving information for one or more vehicles on a route of the first vehicle at a current time based on the first driving information; and transmitting the first vehicle map to the first vehicle.

Herein the generating the vehicle map is generating, if the second vehicle is identical to the fourth vehicle, the vehicle map by using driving information generated more lately among the second driving information and the fourth driving information.

Herein the determining whether the second vehicle is the same as the fourth vehicle includes: comparing an identifier of the second vehicle included in the second driving information with an identifier of the fourth vehicle included in the fourth driving information; and determining whether the second vehicle is the same as the fourth vehicle based on a result of the comparison.

Herein the determining whether the second vehicle is the same as the fourth vehicle is determining, if an identifier is not included in the second driving information or the fourth driving information, whether the second vehicle is the same as the fourth vehicle by using position information and an attitude angle of the second vehicle included in the second driving information, and position information and an attitude angle of the fourth vehicle included in the fourth driving information.

Herein the determining whether the second vehicle is the same as the fourth vehicle includes: extracting first feature points for the second vehicle on the first image; extracting second feature points for the fourth vehicle on the second image; and determining whether the second vehicle is the same as the fourth vehicle based on whether the first feature points are matched with the second feature points.

Herein the second vehicle is determined to be the same as the fourth vehicle if the first feature points are matched with the second feature points and a distance between the second vehicle and the fourth vehicle is less than or equal to a threshold value.

Herein determining whether the second vehicle is the same as the fourth vehicle is determining whether the second vehicle is the same as the fourth vehicle by using a machine learning model that is trained by receiving a plurality of training images, for each of a plurality of vehicle models, of different sizes from each other as one input.

In accordance with another aspect of the present disclosure, there is provided a vehicle map providing method performed by a first vehicle on which a driving information providing apparatus is mounted, the method comprising: receiving, from a second vehicle positioned around the first vehicle, first information including a first image captured by the second vehicle, first own vehicle driving information of the second vehicle, and first surrounding vehicle driving information for a third vehicle on the first image; receiving, from a fourth vehicle positioned around the first vehicle, second information including a second image captured by the fourth vehicle, second own vehicle driving information of the fourth vehicle, and second surrounding vehicle driving information for a fifth vehicle on the second image; determining whether the third vehicle is the same as the fifth vehicle by using pre-stored vehicle map information, or the first information and the second information; and generating, according to whether the third vehicle is the same as the fifth vehicle, a vehicle map at a current time by using the first own vehicle driving information and the second own vehicle driving information, and at least one of the first surrounding vehicle driving information and the second surrounding vehicle driving information.

According to an embodiment of the present disclosure, even if there is a vehicle that does not have a module supporting a function such as the V2V communication or the V2I communication, a vehicle map including driving information for the vehicle that does not have the module may be provided to another vehicle or another driver. In addition, a vehicle map including driving information for a surrounding vehicle that is not detected by its own vehicle may be provided to the corresponding vehicle. Therefore, the driving assistance service may be rapidly, accurately and actively provided to each vehicle.

DETAILED DESCRIPTION

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
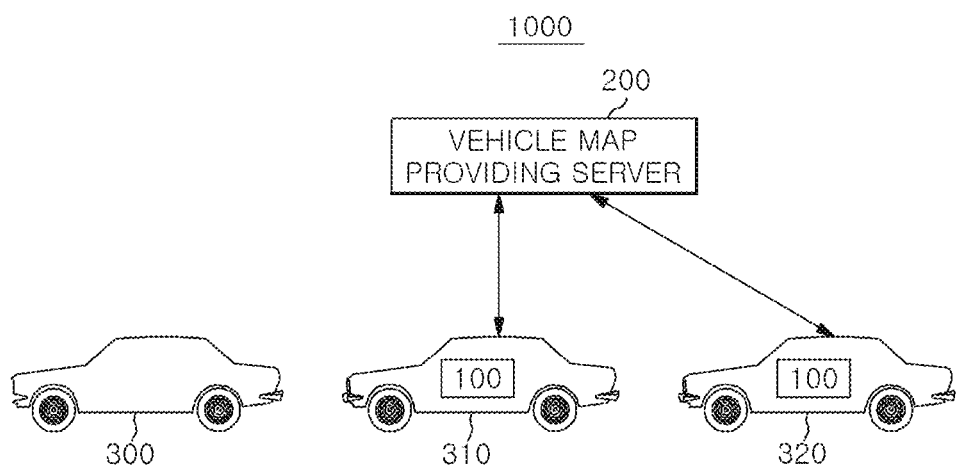
FIG. 1 shows a diagram illustrating relationship between vehicles on which driving information providing apparatuses are mounted and another vehicle on which the driving information providing apparatus is not mounted, and a vehicle map providing server performing communication with each vehicle according to an embodiment.

FIG. 1 shows a diagram illustrating relationship between vehicles 310 and 320 on which driving information providing apparatuses 100 are mounted and another vehicle 300 on which the driving information providing apparatus 100 is not mounted, and a vehicle map providing server 200 performing communication with the vehicles 310 and 320 according to an embodiment.

However, since FIG. 1 is just an example, the idea of the present disclosure is not limited to that illustrated in FIG. 1.

Referring to FIG. 1, three vehicles are shown. The second vehicle 310 and the third vehicle 320 are each equipped with the driving information providing apparatus 100, but the first vehicle 300 is not equipped with the driving information providing apparatus 100. Herein, the driving information providing apparatus 100 may be a module supporting a communication function such as V2V or V2I.

In the second vehicle 310 and the third vehicle 320, the driving information providing apparatus 100 mounted on each of the vehicles 310 and 320 not only obtains driving information for their own vehicles 310 and 320, and calculates driving information for a surrounding vehicle. Herein, the driving information may include at least one of position information, attitude angle information, traveling direction information, speed information, an identifier of the corresponding vehicle, and time information of obtaining the driving information for the corresponding vehicle, but is not limited thereto.

The driving information obtained or calculated in this way is transmitted to the vehicle map providing server 200. For example, driving information for the first vehicle 300 may be calculated by the driving information providing apparatus 100 mounted on the second vehicle 310 or the third vehicle 320 and may be transmitted to the vehicle map providing server 200. In other words, even if the first vehicle 300 itself cannot calculate the driving information for its own vehicle and transmit it to the vehicle map providing server 200, the second vehicle 310 or the third vehicle 320 may calculate the driving information for the first vehicle 300 and transmit the driving information to the vehicle map providing server 200.

The vehicle map providing server 200 collects the received driving information, generates a vehicle map, and transmits the vehicle map to each of the vehicles 310 and 320. For example, a vehicle map including the driving information for the first vehicle 300 as well as the driving information for the third vehicle 320 may be transmitted to the second vehicle 310. In addition, a vehicle map including the driving information for the second vehicle 310 may be transmitted to the third vehicle 320. Even if the third vehicle 320 cannot detect the first vehicle 300, the vehicle map may further include the driving information for the first vehicle 300 detected by the second vehicle 310 and may be transmitted to the third vehicle 320.

Herein, the vehicle map indicates map data displaying the above-described driving information not only for an own vehicle but also for the surrounding vehicle on the map. Since the position, attitude angle, traveling direction, or speed of the surrounding vehicle may be identified through the vehicle map, various driving assistance services of ADAS using them, such as a function of Forward Collision Warning, Automatic Braking System, Blind Spot Detection, or the like may be provided in each of the vehicles 310 and 320.

In other words, according to an embodiment, even if there is a vehicle that does not have the module supporting the communication function such as the V2V or the V2I, a vehicle map including driving information for the vehicle that does not have the module may be provided to another vehicle or another driver. In addition, a vehicle map including driving information for a surrounding vehicle that is not detected by the own vehicle may be provided to the corresponding vehicle. Therefore, the driving assistance service may be rapidly, accurately, and actively provided to each vehicle.

Hereinafter, a detailed technology that provides such a technical idea will be described.

Figure 2:
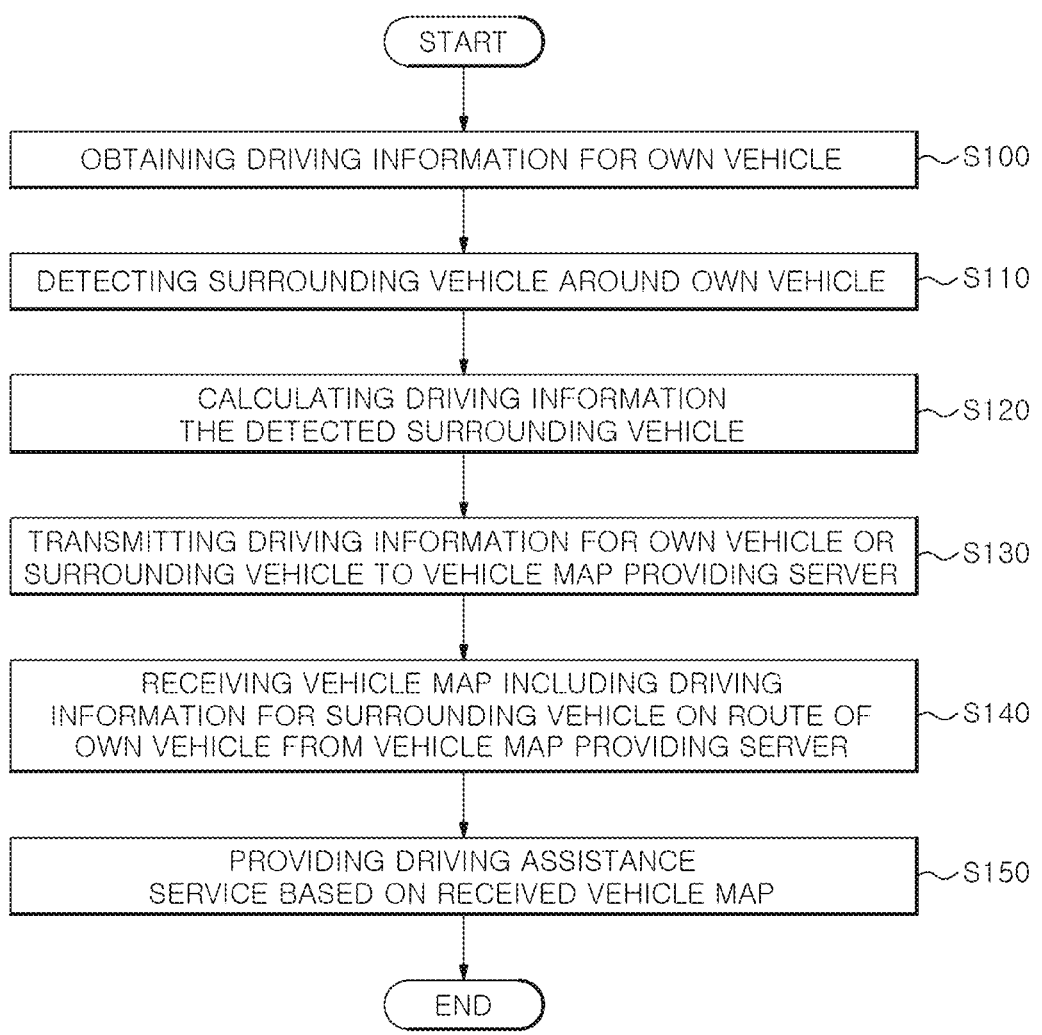
FIG. 2 shows a flowchart regarding a procedure performing a driving information providing method according to an embodiment.
Figure 3:
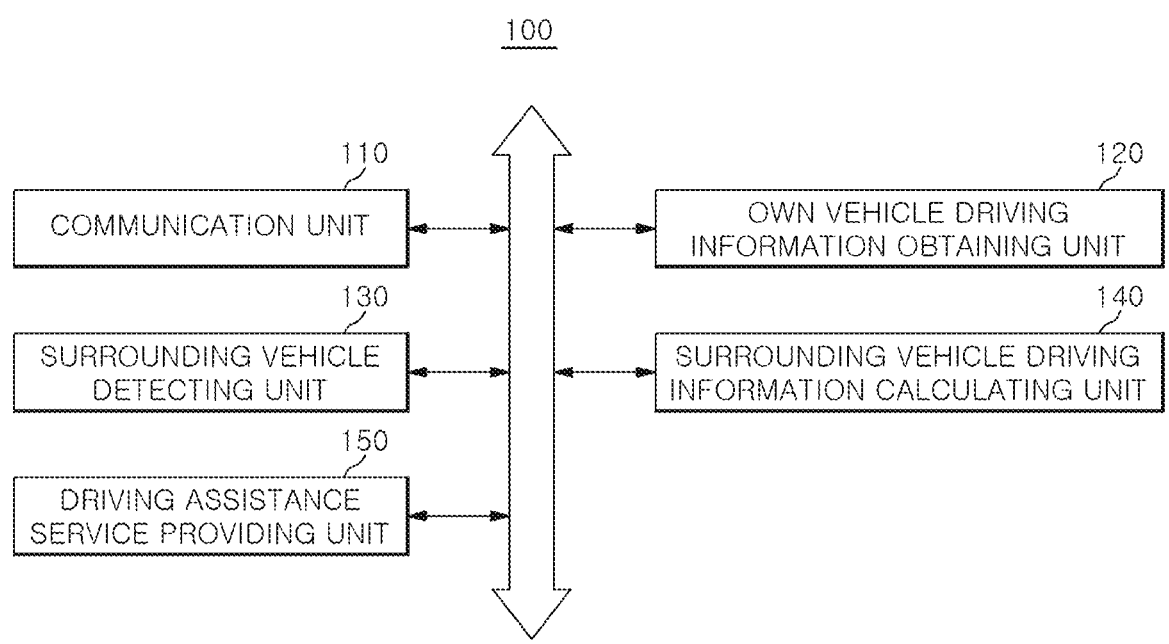
FIG. 3 shows a block diagram of a driving information providing apparatus according to an embodiment.

FIG. 2 shows a flowchart illustrating a procedure performing a driving information providing method according to an embodiment, FIG. 3 shows a block diagram of the driving information providing apparatus 100 that performs the driving information providing method illustrated in FIG. 2.

Herein, since FIGS. 2 and 3 are just examples, the idea of the present disclosure is not limited to those illustrated in FIGS. 2 and 3.

Referring to FIG. 2, the driving information providing method is performed by including a step S100 of obtaining driving information for its own vehicle, a step S110 of detecting a surrounding vehicle around the own vehicle, a step S120 of calculating driving information for the detected surrounding vehicle, a step S130 of transmitting at least one of the driving information for the own vehicle and for the surrounding vehicle to the vehicle map providing server 200 that generates a vehicle map by collecting driving information for each of a plurality of vehicles, a step S140 of receiving a vehicle map including driving information for a surrounding vehicle on a route of the own vehicle from the vehicle map providing server 200, and a step S150 of providing a predetermined driving assistance service based on the received vehicle map.

To this end, the driving information providing apparatus 100 includes a communication unit 110, an own vehicle driving information obtaining unit 120, a surrounding vehicle detecting unit 130, a surrounding vehicle driving information calculating unit 140, and a driving assistance service providing unit 150. Each component of the driving information providing apparatus 100 may be implemented in a form of a software module or a hardware module executed by a processor, or a combination of the software module and the hardware module.

Hereinafter, each component of the driving information providing apparatus 100 and operations or effects performed by the each component will be described in detail with reference to FIGS. 1 through 4.

The communication unit 110 is a wireless communication module supporting V2V communication or V2I communication. For example, the communication unit 110 may be a wireless communication module capable of performing wireless communication by adopting communication methods by adopting communication methods such as CDMA, GSM, W-CDMA, TD-SCDMA, WiBro, LTE, EPC, Wireless LAN, Wi-Fi, Bluetooth, Zigbee, Wi-Fi Direct (WFD), Ultra-wideband (UWB), Infrared Data Association (IrDA), Bluetooth Low Energy (BLE), or Near Field Communication (NFC).

The vehicle may transmit and receive data with the vehicle map providing server 200 through the communication unit 110 after connecting to at least one of a plurality of V2I base stations distributed and installed on a road. For example, the communication unit 110 is equipped with an algorithm for connecting to a V2I base station closest to a current position of the vehicle among a plurality of the V2I base stations. If the communication unit 110 connects to one V2I base station based on this algorithm, the vehicle may transmit and receive data with the vehicle map providing server 200 through the connected V2I base station through the communication unit 110.

The own vehicle driving information obtaining unit 120 is a component that obtains driving information for its own vehicle. Herein, among the driving information for the own vehicle, a position and an attitude angle may be obtained through various methods.

For example, the position and the attitude angle of the own vehicle may be obtained by using a GPS signal received from a GPS satellite or information given in advance.

Alternatively, the position and the attitude angle of the own vehicle may be obtained through a method of matching a landmark on a detailed map with an image captured by the own vehicle. Herein, the method of matching the landmark on the detailed map with the image captured by the own vehicle may be performed by including a step of obtaining initial position information of a camera by matching a landmark on the detailed map corresponding to initial position information of the GPS-based own vehicle onto an image capture by the camera of the own vehicle; a step of obtaining estimated position information of the camera based on a matching error between the image and a landmark on the detailed map corresponding to each of a plurality of candidate position information sampled based on the initial position information of the camera and the driving information of the own vehicle; and a step of obtaining estimated position information of the own vehicle based on the estimated position information of the camera.

In addition, speed information of the own vehicle may be obtained by using a wheel speed value that may be obtained as CAN data.

Further, traveling direction information of the own vehicle may be obtained based on GPS information or the like.

Furthermore, an identifier of the own vehicle may be an ID of the own vehicle itself that is given in advance from the vehicle map providing server 200.

In addition, time information of obtaining the above-described driving information for the own vehicle may refer to GPS-based time information at which each of the above-described driving information is obtained.

The surrounding vehicle detecting unit 130 is a component that detects the surrounding vehicle positioned around the own vehicle. For example, the surrounding vehicle detecting unit 130 may be implemented by a camera capturing around the own vehicle or a sensor detecting a vehicle that is traveling or is not moving around the own vehicle.

The surrounding vehicle driving information calculating unit 140 is a component that calculates driving information for the surrounding vehicle detected by the surrounding vehicle detecting unit 130. First of all, a method of calculating the position information for surrounding vehicle will be described. To this end, an image including the surrounding vehicle captured by the surrounding vehicle detecting unit 130 may be obtained.

Figure 4:
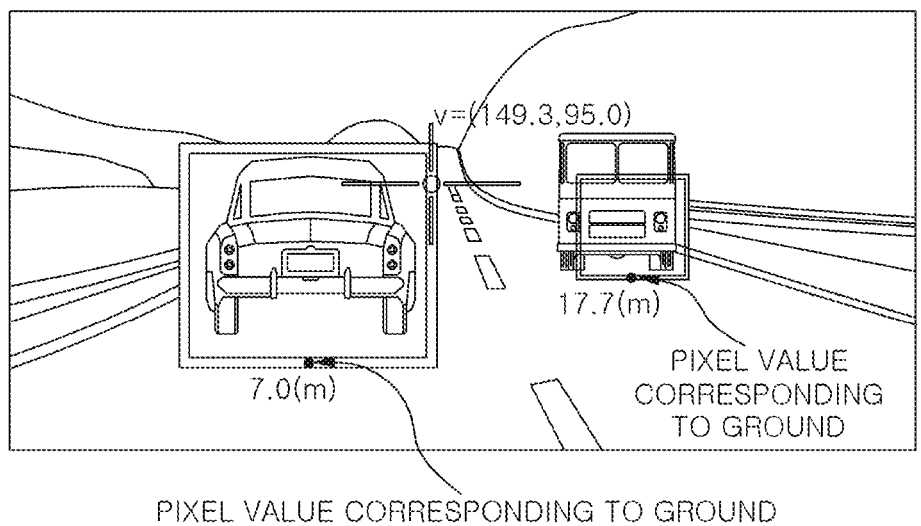
FIG. 4 shows an image illustrating surrounding vehicles captured by a vehicle according to an embodiment.

The surrounding vehicle driving information calculating unit 140 obtains position information at which the surrounding vehicle is positioned on the ground, that is, a coordinate value of a pixel from the obtained image. Herein, if an area in which the surrounding vehicle is detected on the image is bounded by a predetermined bounding box, the obtained coordinate value of the pixel refers to a coordinate value of a pixel contacting the ground on the bounding box, which is illustrated in FIG. 4. If the surrounding vehicle is relatively far away from the own vehicle, the corresponding pixel value may be displayed relatively close to a vanishing point on the image. If the surrounding vehicle is relatively close away from the own vehicle, the corresponding pixel value may be displayed relatively far from the vanishing point on the image. In other words, the corresponding pixel value has a predetermined correlation with a separation distance between the surrounding vehicle and the own vehicle. Therefore, the separation distance between the own vehicle and the surrounding vehicle may be calculated based on an algorithm using this correlation.

Thereafter, the surrounding vehicle driving information calculating unit 140 converts a format of the coordinate value on the image for the surrounding vehicle captured by the surrounding vehicle detecting unit 130 into a format of a coordinate value in which a camera mounted on the own vehicle looks forward by using following Equation 1.

$$m_{new} = = KRK^{-1} m \qquad \text{Equation 1}$$

Herein, K denotes a 3×3 matrix of intrinsic parameters of the camera mounted on the own vehicle, R denotes a rotation matrix that converts a specific pixel value m on the image captured by the own vehicle into a coordinate system in which the camera looks forward, and $m_{new}$ denotes the converted coordinate value in the coordinate system in which the camera mounted on the own vehicle looks forward. In the present disclosure, the specific pixel value m may be position information where the surrounding vehicle is positioned on the ground, that is, a coordinate value of the pixel on the above-described obtained image. In addition, a value of the rotation matrix R may be determined by using a rotation matrix based on a vehicle coordinate system calculated when the camera is mounted on the own vehicle, or by using a rotation matrix related to the attitude angle of the camera based on the ground provided by a camera-based ADAS.

Thereafter, the surrounding vehicle driving information calculating unit 140 calculates a rotation angle θ between the surrounding vehicle and a longitudinal axis direction that is a traveling direction of the own vehicle by using following Equation 2.

$$\theta = HFOV \frac{u_{new} - c_x}{image - width} \qquad \text{Equation 2}$$

Herein, HFOV indicates a horizontal angle of view of a camera, $u_{new}$ indicates an x-axis coordinate value of $m_{new}$ in Equation 1, cx indicates a principal point of a camera, and image-width indicates horizontal resolution of an image.

Thereafter, the surrounding vehicle driving information calculating unit 140 calculates a position [$x_a$, $y_a$] of the surrounding vehicle by using Equation 3 below.

$$x_a = x_s + l \cos(\theta_s + \theta)$$

$$y_a = y_s + l \sin(\theta_s + \theta) \qquad \text{Equation 3}$$

Herein, [$x_s$, $y_s$, $\theta_s$] indicates a position and an attitude angle of the own vehicle that are obtained by the own vehicle driving information obtaining unit 120, and l indicates a separation distance between the own vehicle and the surrounding vehicle calculated by the surrounding vehicle driving information calculating unit 140. θ indicates the rotation angle between the longitudinal axis direction of the own vehicle and the detected position of the surrounding vehicle that is calculated in Equation 2, and [$x_a$, $y_a$] indicates the position of the surrounding vehicle detected on the image. Therefore, the attitude angle of the surrounding vehicle detected on the image becomes θ+$\theta_s$.

Thereafter, the surrounding vehicle driving information calculating unit 140 calculates traveling direction information of the surrounding vehicle detected on the image by using Equation 4 below.

$$x_{t1:t2} = x_{a,t2} - x_{a,t1}$$

$$y_{t1:t2} = y_{a,t2} - y_{a,t1}$$

$$\theta_a = \operatorname{atan}\left(\frac{y_{t1:t2}}{x_{t1:t2}}\right) \qquad \text{Equation 4}$$

Herein, [$x_{a,t1}$, $y_{a,t1}$] and [$x_{a,t2}$, $y_{a,t2}$] represent the positions of the surrounding vehicle at time t1 and time t2, respectively, which are calculated by using Equation 3, and $\theta_a$ represents the traveling direction of the surrounding vehicle. If the surrounding vehicle is not moving, a value of [$x_{a,t1:t2}$, $y_{a,t1:t2}$] is 0, or it has a value close to 0 due to an image recognition error. In this case, if there is a previously calculated value for $\theta_a$, the previous value is used as it is. Otherwise, $\theta_a$ uses $\theta_s$ that is the same value as the direction of the own vehicle.

Thereafter, the surrounding vehicle driving information calculating unit 140 calculates speed information of the surrounding vehicle detected on the image by using Equation 5 below.

$$d = \sqrt{x_{t1:t2}^2 + y_{t1:t2}^2}$$

$$v = d/(t2 - t1) \qquad \text{Equation 5}$$

Herein, d denotes a traveling distance between the time t1 and the time t2, which is calculated by using Equation 4, and v denotes a speed of the surrounding vehicle.

On the other hand, the surrounding vehicle driving information calculating unit 140 obtains information on an identifier of the surrounding vehicle and assigns it to the surrounding vehicle and the driving information for the surrounding vehicle. As an obtaining method, there is a method of recognizing a license plate number of the surrounding vehicle from the image including the surrounding vehicle captured by the surrounding vehicle detecting unit 130. However, if the license plate number is not recognized from the image, the identifier may not be assigned to the corresponding driving information and the corresponding surrounding vehicle.

The driving assistance service providing unit 150 provides a predetermined driving assistance service based on the vehicle map received through the communication unit 110. For example, the driving assistance service providing unit 150 may provide various driving assistance services of ADAS, such as a function of Forward Collision Warning, Automatic Braking System, a Blind Spot Detection, or the like.

To this end, the driving assistance service providing unit 150 may predict and provide driving information for the surrounding vehicle based on a current time by using driving information for the surrounding vehicle included in the vehicle map. Herein, reason for description of "predict" is derived from that the driving information included in the vehicle map is driving information obtained or calculated at a preceding time prior to "the current time" by each of a plurality of vehicles. In other words, this is because the driving information at the current time may be "predicted" based on a course of driving information obtained or calculated at the preceding time. The driving assistance service providing unit 150 may predict driving information for the surrounding vehicle based on the current time by using Equation 6 below.

$$x_{a,t2} = x_{a,t1} + v(t2-t1)\cos\theta_a$$
$$y_{a,t2} = y_{a,t1} + v(t2-t1)\sin\theta_a$$

Equation 6

Herein, $(x_{a,t2}, y_{a,t2})$ indicates a position of the surrounding vehicle that is predicted based on the current time t2, and the time t1 indicates a time at which driving information was obtained or calculated by each vehicle.

On the other hand, the driving assistance service providing unit 150 may provide the above-described driving assistance service if a predetermined condition is satisfied. For example, the driving assistance service providing unit 150 may predict driving information for the own vehicle based on the current time by using the driving information for the own vehicle included in the vehicle map, and then make the above-described driving assistance service to be provided if a difference in information between the predicted driving information and actual driving information for the own vehicle is less than a threshold value. Through this, validity of the vehicle map may be verified.

Next, the vehicle map providing server 200 will be described.

Figure 5:
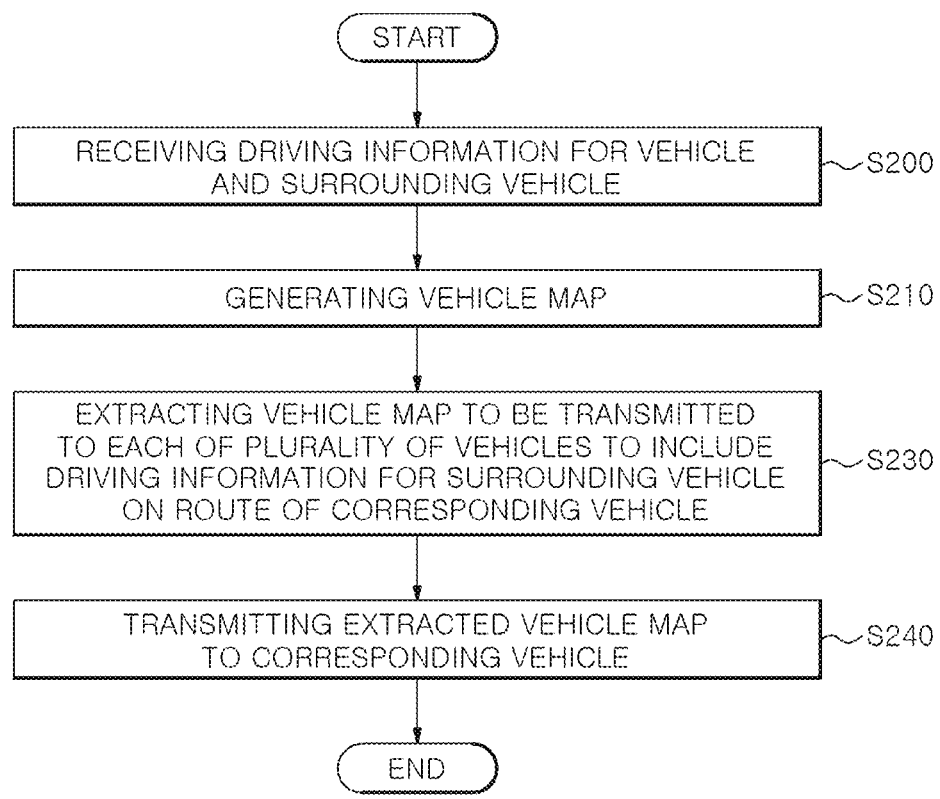
FIG. 5 shows a flowchart illustrating a procedure performing a vehicle map providing method according to an embodiment.
Figure 7:
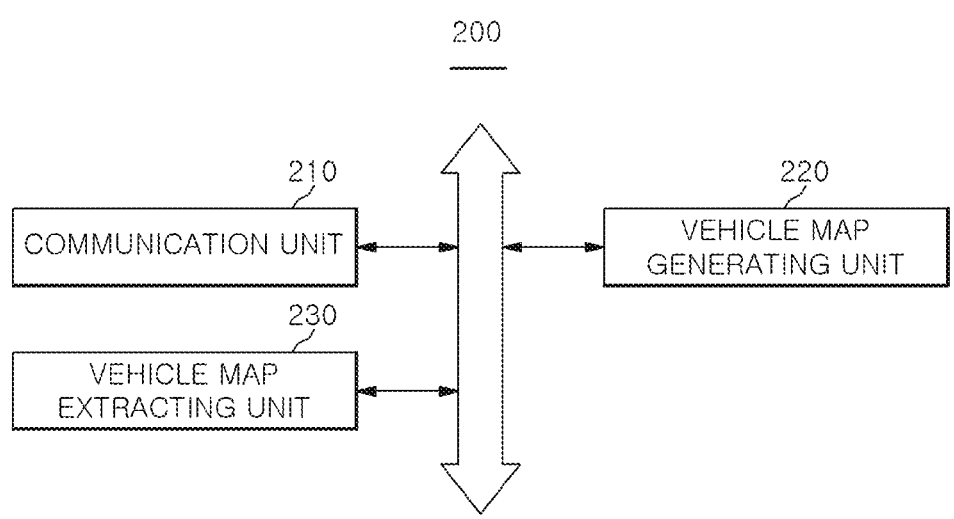
FIG. 7 shows a block diagram of a vehicle map providing server according to an embodiment.

FIG. 5 shows a flowchart illustrating a procedure performing a vehicle map providing method according to an embodiment, and FIG. 7 shows a block diagram of the vehicle map providing server 200 performing the vehicle map providing method illustrated in FIG. 5.

Herein, since FIGS. 5 and 7 are just examples, the idea of the present disclosure is not limited to those illustrated in FIGS. 5 and 7.

Referring to FIG. 5, the vehicle map providing method is performed by including a step S200 of receiving driving information obtained for a vehicle and driving information calculated for a surrounding vehicle of the vehicle from each of a plurality of vehicles, a step S210 of generating a vehicle map by collecting, for each vehicle, the received driving information for each of the plurality of the vehicles and the received driving information for a surrounding vehicle of the plurality of the vehicles, a step S230 of extracting a vehicle map to be transmitted to each of a plurality of vehicles so as to include driving information on surrounding vehicles on a route of the corresponding vehicle, and a step S240 of transmitting each of the extracted vehicle map to the corresponding vehicle.

Figure 6:
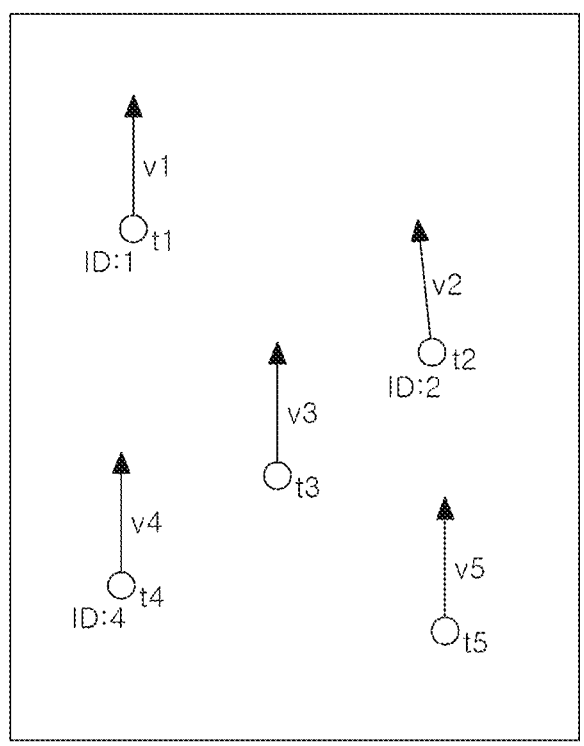
FIG. 6 shows a diagram illustrating a vehicle map capable of being provided according to a vehicle map providing method according to an embodiment.

Herein, the vehicle map refers to map data displaying, on the map, the above-described driving information not only for its own vehicle but also for the surrounding vehicles, and is illustrated in FIG. 6 as an example. Since a position, attitude angle, traveling direction, or speed of the surrounding vehicles may be identified through the vehicle map, various driving assistance services of ADAS using them, such as a function of Forward Collision Warning, Automatic Braking System, Blind Spot Detection, or the like may be provided in each of the vehicles 310 and 320.

To this end, the vehicle map providing server 200 includes a communication unit 210, a vehicle map generating unit 220, and a vehicle map extracting unit 230 as components. Each component of the vehicle map providing server 200 may be implemented in the form of a software module or a hardware module executed by a processor, or a combination of the software module and the hardware module.

Hereinafter, each component of the vehicle map providing server 200 and operations or effects performed by the each component will be described in detail with reference to FIGS. 5 through 9.

The communication unit 210 is a wireless communication module. For example, the communication unit 210 may be a wireless communication module capable of performing wireless communication by adopting communication methods by adopting communication methods such as CDMA, GSM, W-CDMA, TD-SCDMA, WiBro, LTE, EPC, Wireless LAN, Wi-Fi, Bluetooth, Zigbee, Wi-Fi Direct (WFD), Ultra-wideband (UWB), Infrared Data Association (IrDA), Bluetooth Low Energy (BLE), or Near Field Communication (NFC).

The vehicle map providing server 200 may transmit and receive data with a vehicle through any one of a plurality of V2I base stations distributed and installed on a road through the communication unit 210. For example, if a vehicle connects to a V2I base station close to its current position among the plurality of the V2I base stations, the vehicle map providing server 200 may transmit and receive data with the vehicle or the driving information providing apparatus 100 mounted on the vehicle through the V2I base station connected by the vehicle through the communication unit 210.

Through the communication unit 210, the vehicle map providing server 200 receives driving information for a plurality of vehicles. In this case, the received driving information may include not only information on a vehicle that transmitted the driving information, but also information on a surrounding vehicle around the vehicle that transmitted the driving information. In addition, the received driving information may include at least one of position information, attitude angle information, traveling direction information, speed information, and an identifier of the corresponding vehicle, and time information of obtaining the driving information for the corresponding vehicle, but is not limited thereto.

The vehicle map generating unit 220 collects, for each vehicle, the above-described driving information received through the communication unit 210. The collecting process will be described with reference to FIG. 8.

Figure 8:
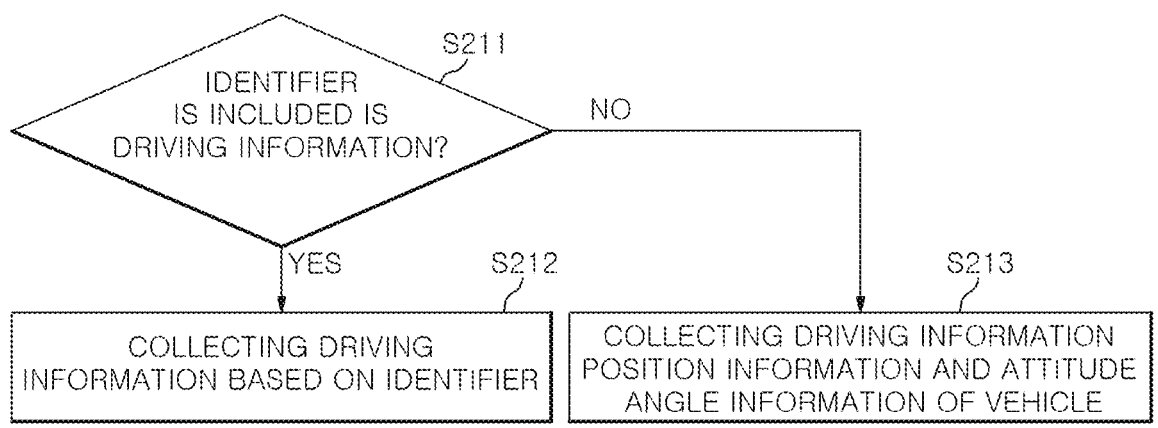
FIG. 8 shows a flowchart illustrating a process of collecting driving information according to an embodiment.

Referring to FIG. 8, in a step S211, the vehicle map generating unit 220 determines whether an identifier is included in driving information received through the communication unit 210. The identifier may include a vehicle ID or a license plate number. In some cases, the received driving information may not include the identifier. For example, this may be the case when its own vehicle does not recognize the license plate number of the surrounding vehicle.

As a result of the determination, if the identifier is included in the received driving information, in a step S212, the vehicle map generating unit 220 collects the driving information for each vehicle based on the identifier. Accordingly, for example, received driving information for a first vehicle and received driving information for a second vehicle may be separately collected.

However, as a result of the determination, if the identifier is not included in the received driving information, in a step S213, the vehicle map generating unit 220 according to an embodiment may collect the driving information for each vehicle based on position information and attitude angle information of the vehicle. The step S213 will be described in more detail below.

First, the vehicle map generating unit 220 extracts the position information and the attitude angle information of the vehicle from the driving information that does not include the identifier. Thereafter, the vehicle map generating unit 220 derives each error by comparing the extracted position information and the extracted attitude angle information with latest position information and latest attitude angle information that have been previously collected, that is, for each vehicle that has an identifier. The vehicle map generating unit 220 extracts an identifier for a vehicle having position information and attitude information in which the derived error is the minimum or less than a threshold value. The vehicle map generating unit 220 performs the collection after assuming that the extracted identifier is the identifier for the driving information that does not include the above-described identifier.

Herein, in the process of deriving the above-described error, a method of using the Mahalanobis Distance calculation that is following Equation 7 by modeling an error of the position information and the attitude angle information of a vehicle as a Gaussian probability distribution (mean and covariance) may be applied.

$$D_m = \sqrt{(P_1 - P_2)^T (C_1 + C_2)^{-1} (P_1 - P_2)} \quad \text{Equation 7}$$

Herein, each of P1 and P2 indicates the position/direction of each of two vehicles from which the error is derived, and each of C1 and C2 indicates covariance matrix corresponding to each of P1 and P2. If a value of the Mahalanobis Distance Dm is less than or equal to a threshold value, it is determined as being overlapped.

In addition, the vehicle map generating unit 220 according to another embodiment may extract feature points from an image including the surrounding vehicle captured by the surrounding vehicle detecting unit 130, perform matching between vehicles based on the feature points, and then collect driving information for each vehicle. Hereinafter, a method of collecting the driving information performed by the vehicle map generating unit 220 according to another embodiment will be described.

Figure 9:
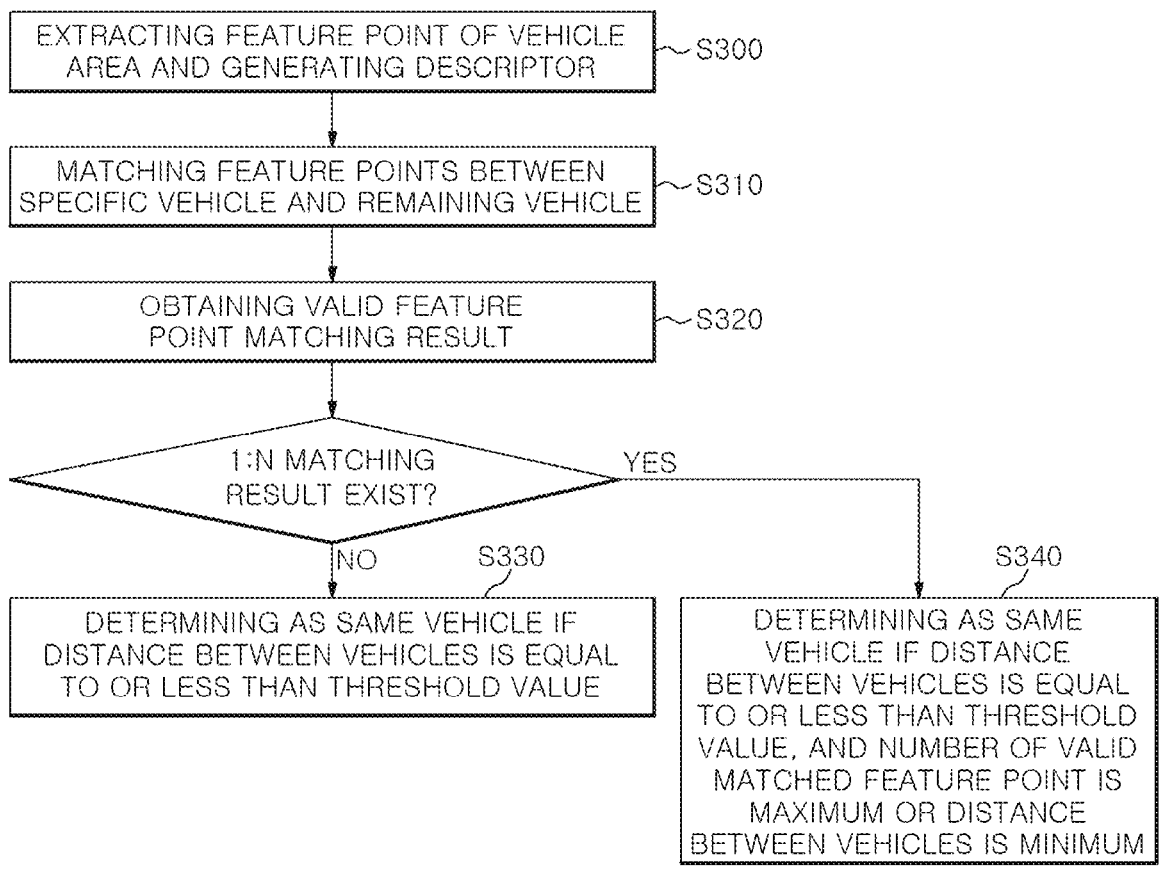
FIG. 9 shows a flowchart illustrating a process of collecting driving information according to another embodiment.

Referring to FIG. 9, in a step S300, the vehicle map generating unit 220 may first extract feature points of a vehicle area detected from an image including a surrounding vehicle captured by the surrounding vehicle detecting unit 130 and generate a descriptor corresponding thereto. Specifically, the vehicle map generating unit 220 may detect the vehicle area for each vehicle from a surrounding image captured by the surrounding vehicle detecting unit 130. Herein, the vehicle area may indicate the bounding box illustrated in FIG. 4.

Figure 10:
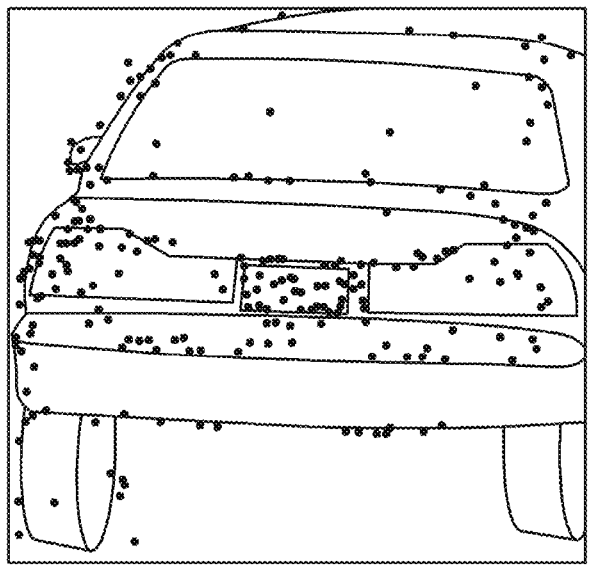
FIG. 10 shows an image illustrating a vehicle area on which feature points are extracted according to the embodiment of FIG. 9.

After detection of the vehicle area, the vehicle map generating unit 220 may extract the feature points for each vehicle from the vehicle area on the surrounding image captured by the surrounding vehicle detecting unit 130 by using a method of a Scale Invariant Feature Transform (SIFT), Speeded Up Robust Features (SURF), Oriented Fast and Rotated BRIEF (ORB), or the like. FIG. 10 shows a diagram illustrating the feature points extracted from the vehicle area by the vehicle map generating unit 220. Thereafter, the vehicle map generating unit 220 may generate a descriptor by using image information around the feature points.

Figure 11:
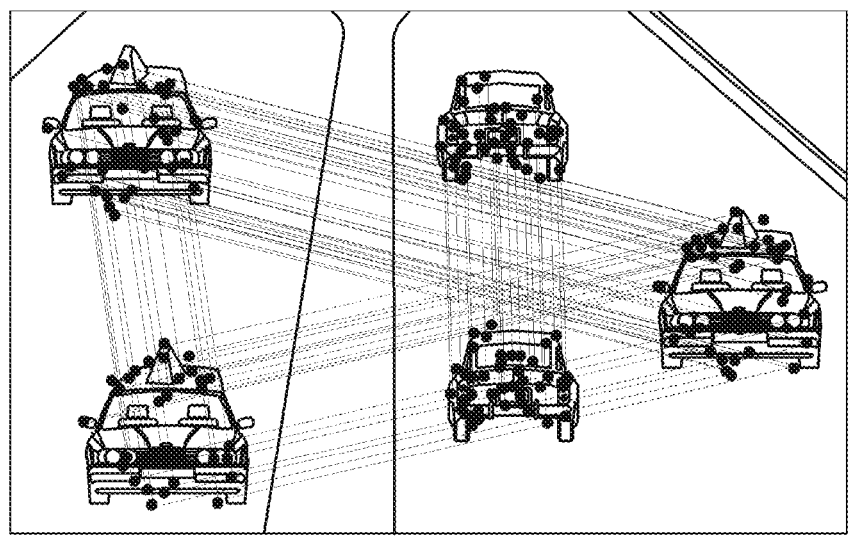
FIG. 11 shows an image on which feature points are matched according to the embodiment of FIG. 9.

After the descriptor is generated, in a step S310, the vehicle map generating unit 220 may perform matching between a specific vehicle and a remaining vehicle by using the extracted feature points and the descriptor. FIG. 11 shows a matching result based on the feature points and the descriptor performed by the vehicle map generating unit 220.

Thereafter, in a step S320, the vehicle map generating unit 220 may obtain a valid matching result by using RANSAC-based Affine Transformation. Since noise may exist in the matching result, the vehicle map generating unit 220 may determine validity of the matching result by using the RANSAC-based Affine Transformation.

Coordinates (u,v) that are converted from pixel coordinates (x,y) of the feature point by the Affine Transformation are as shown in Equation 8.

$$\begin{bmatrix} u \\ v \end{bmatrix} = \begin{bmatrix} m_1 & m_2 \\ m_3 & m_4 \end{bmatrix} \begin{bmatrix} x \\ y \end{bmatrix} + \begin{bmatrix} t_x \\ t_y \end{bmatrix} \quad \text{Equation 8}$$

Herein, $m_1$, $m_2$, $m_3$, $m_4$, $t_x$, and $t_y$ may indicate parameters of the Affine Transformation. In order to obtain the parameters of the Affine Transformation, the vehicle map generating unit 220 may convert Equation 8 into a form such as AX=B. Specifically, the vehicle map generating unit 220 may convert Equation 8 into Equation 9 to obtain the parameters of the Affine Transformation.

$$\begin{bmatrix} x & y & 0 & 0 & 1 & 0 \\ 0 & 0 & x & y & 0 & 1 \\ & & \cdots & & & \\ & & \cdots & & & \end{bmatrix} \begin{bmatrix} m_1 \\ m_2 \\ m_3 \\ m_4 \\ t_x \\ t_y \end{bmatrix} = \begin{bmatrix} u \\ v \\ \vdots \end{bmatrix} \quad \text{Equation 9}$$

When the parameters of the Affine Transformation for all the feature points are obtained by Equation 9, the vehicle map generating unit 220 may determine corresponding matching as valid matching for feature points whose an error for pixel coordinates is less than or equal to a threshold value, and then identify the number of valid feature points.

Thereafter, the vehicle map generating unit 220 may repeat the above-described matching process predetermined number of times, and then determine $m_1$, $m_2$, $m_3$, $m_4$, $t_x$, and $t_y$ as the parameters of the Affine Transformation when the number of valid feature points is the largest.

In this case, if there is no 1:N matching result in the matching result between feature points, that is, there is no one-to-many matching result, in a step S330, the vehicle map generating unit 220 may determine vehicles to be the same vehicle if a distance between the vehicles is less than or equal to a threshold value. Specifically, if a distance between the feature points of the vehicles is less than or equal to a threshold value, the vehicle map generating unit 220 may determine that the vehicles are the same vehicle.

On the other hand, if there is a one-to-many matching result in the matching result between feature points, in a step S340, the vehicle map generating unit 220 may determine vehicles to be the same vehicle if a distance between the vehicles is less than or equal to the threshold value, and the matched number of valid feature points is the largest or the distance between the vehicles is the smallest. Specifically, the vehicle map generating unit 220 may determine that vehicles are the same vehicle if the distance between the feature points of the vehicles is less than or equal to the threshold value, and the matched number of valid feature points is the largest or the distance between the vehicles is the smallest.

When it is determined whether the vehicles are the same vehicle according to the above-described method, the vehicle map generating unit 220 may collect driving information for each vehicle. The vehicle map generating unit 220 may determine driving information received in last among driving information collected by determining that the vehicles are the same vehicle as driving information of the same vehicle.

In addition, the vehicle map generating unit 220 according to another embodiment may collect the driving information for each vehicle by using a vehicle classifier generated through machine learning such as deep learning. Hereinafter, a method of collecting driving information performed by the vehicle map generating unit 220 according to another embodiment will be described.

Figure 12:
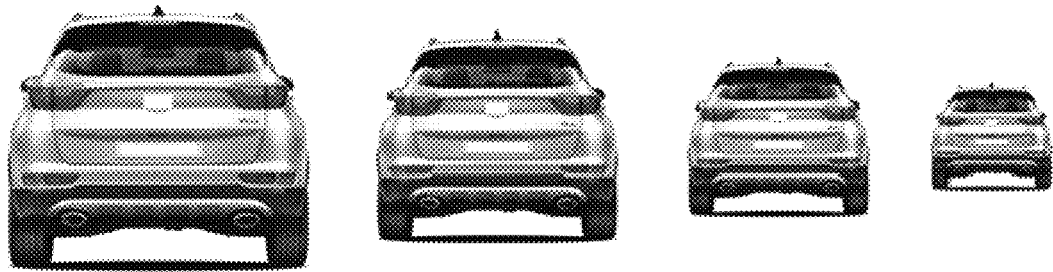
FIG. 12 shows a training image used for generating a vehicle classifier according to another embodiment.

Before collecting the driving information for each vehicle, the vehicle classifier may be generated by the vehicle map providing server 200 and may be stored in advance. To this end, the vehicle map providing server 200 may first generate training images of various sizes as shown in FIG. 12 for each of a plurality of vehicle models.

As described above, the generation of the training images of various sizes for one vehicle model is to generate a vehicle classifier capable of recognizing the vehicle model at various distances. Through this, it is possible to generate an artificial neural network having a higher recognition rate for a vehicle model compared to an artificial neural network generated by learning a training image of a specific size.

In this case, the vehicle map providing server 200 may generate a plurality of training images by varying a size based on a recognizable distance of a vehicle model. In general, if a camera provided in a vehicle faces forward from the vehicle, a size of a vehicle on an image captured by the camera may be determined according to a distance from the camera. Based on this, the vehicle map providing server 200 according to an embodiment may determine a minimum recognition distance and a maximum recognition distance, and may determine a size of each vehicle model on the image at each of the minimum recognition distance and the maximum recognition distance. Thereafter, the vehicle map providing server 200 according to an embodiment may divide between the minimum recognition distance and the maximum recognition distance into arbitrary number of sections, and may generate a training image corresponding to each of the divided sections.

Thereafter, the vehicle map providing server 200 may train the artificial neural network by using the training images of various sizes generated for each of the plurality of the vehicle models as one input. The vehicle map providing server 200 according to an embodiment may generate the vehicle classifier by learning the training images of various sizes for each vehicle model as one input data, and the generated vehicle classifier may be a neural network-based model. The neural network-based vehicle classifier may be implemented as a model such as a Convolution Neural Network (CNN), a Deep Neural Network (DNN), a Recurrent Neural Network (RNN), and a Bidirectional Recurrent Deep Neural Network (BRDNN).

The vehicle classifier according to an embodiment may include an input layer into which the training image is input, an output layer from which a vehicle model corresponding to the input training image is output, and a plurality of hidden layers provided between the input layer and the output layer. The output layer may form a Fully Connected Network with a last hidden layer among the plurality of the hidden layers. In this case, the output layer of the artificial neural network may include nodes for N number of vehicle models, and each node may represent a vehicle model.

If the vehicle classifier is implemented as a CNN model, the plurality of the hidden layers may include a plurality of Convolution Layers and Subsampling Layers. The Convolution Layer may obtain a characterization vector for the training image by applying various Convolution Kernels to an input object image. In this way, the Convolution Kernel may serve as a kind of template for extracting features for a high-dimensional training image. The Subsampling Layer may be a neuron layer that reduces a dimension of the obtained characterization vector, and may lower spatial resolution for the characterization vector generated by the Convolutional Layer. Through this process, the vehicle classifier may reduce complexity of a problem. The Convolutional Layer and the Subsampling Layer may be repeatedly disposed in the hidden layer, so that the above-described process may be repeatedly performed.

The vehicle map providing server 200 may re-adjust the parameters of the artificial neural network in a direction of minimizing an error between an output and a correct answer by using Back Propagation, and may repeatedly train the artificial neural network by using the above-described input until the output converges to the correct answer. The vehicle map providing server 200 according to an embodiment may generate a vehicle classifier according to Supervised Learning. The Supervised Learning may indicate a machine learning method of learning training data including an input and a label corresponding to the input, and the label may indicate the correct answer to the input among the training data.

When following the Supervised Learning method, the vehicle map providing server 200 may generate the vehicle classifier by using a plurality of training images as inputs and learning the training data in which a vehicle model in the training image is associated with an initial label. Specifically, the vehicle map providing server 200 may classify the input training images according to the vehicle model by learning a relationship between the training image that is the input and the vehicle model that is the correct answer.

Alternatively, the vehicle map providing server 200 may generate the vehicle classifier by Semi-supervised Learning using some training data in which the vehicle model is labeled on the training image and remaining training data including unlabeled training images together to learn. Otherwise, the vehicle map providing server 200 may generate the vehicle classifier according to Reinforcement Learning using feedback on whether a learning result is correct.

Alternatively, the vehicle map generating unit 220 may receive the above-described vehicle classifier from an external apparatus.

If the vehicle classifier is generated or provided, the vehicle map generating unit 220 may detect a vehicle area for each vehicle from a surrounding image captured by the surrounding vehicle detecting unit 130. Herein, the vehicle area may indicate the bounding box illustrated in FIG. 4.

Figure 13A:
FIGS. 13A and 13B show an input image that is input into the vehicle classifier according to the embodiment of FIG. 12.
Figure 13B:
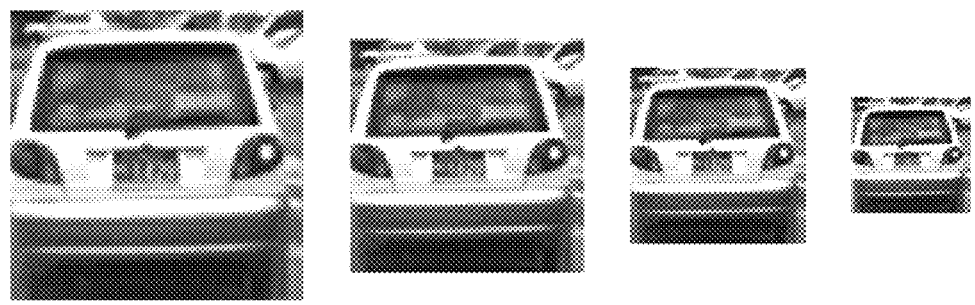

Thereafter, the vehicle map generating unit 220 may change a size of the detected vehicle area to various sizes of the training image used for learning regarding the vehicle classifier. FIG. 13A illustrates a result of detecting a vehicle area for each vehicle from a surrounding image, and FIG. 13B illustrates differently changed sizes of any one vehicle area detected in FIG. 13A.

After variously changing the size of the vehicle area, the vehicle map generating unit 220 may input a plurality of vehicle areas of different sizes from each other as one input to a vehicle classifier, and may determine a vehicle model based on an output result from the vehicle classifier. The vehicle classifier may output reliability of zero to one for each vehicle model, and the vehicle map generating unit 220 may select a vehicle model having the highest reliability, but may determine that it is valid if the reliability is greater than or equal to a threshold value.

In this case, if there are multiple identical vehicle models, the vehicle map generating unit 220 may calculate Mahalanobis Distance by using Equation 7, and then may determine a vehicle having the smallest Mahalanobis Distance as the same vehicle.

If it is determined whether vehicles are the same vehicle according to the above-described method, the vehicle map generating unit 220 may collect driving information for each vehicle. The vehicle map generating unit 220 may determine driving information received in last among driving information collected by determining the vehicles to be the same vehicle as driving information of the same vehicle.

The vehicle map generating unit 220 generates a vehicle map based on the driving information of the same vehicle. At this time, the vehicle map generating unit 220 may generate the vehicle map after removing driving information for which an update is delayed, and this will be described with reference to FIG. 14.

Figure 14:
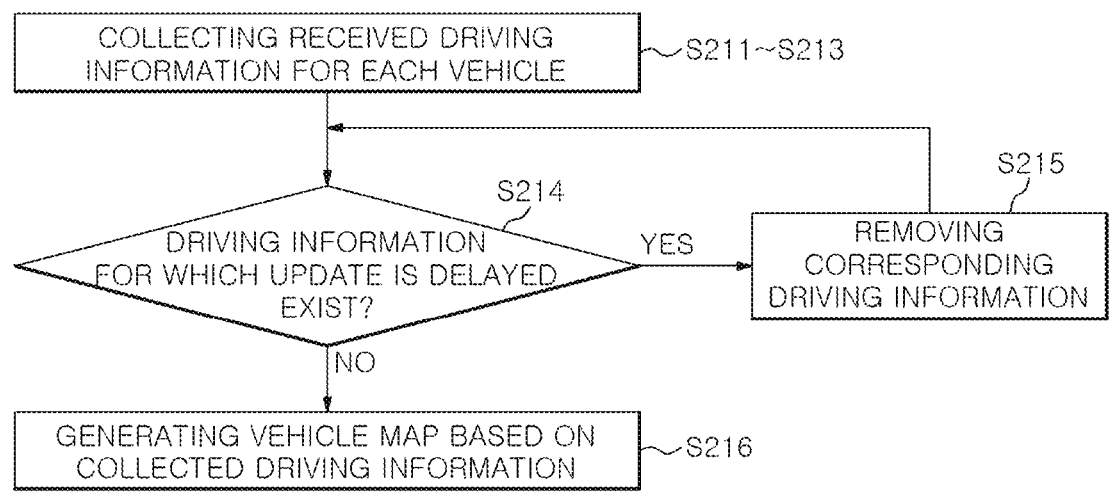
FIG. 14 shows a flowchart illustrating a process of generating a vehicle map according to an embodiment.

Referring to FIG. 14, after the driving information is collected for each vehicle through the method of FIG. 8, in a step S214, the vehicle map generating unit 220 determines, at a time about to generate the vehicle map, how much time has elapsed from a time at which the driving information for each vehicle is updated or a time at which the driving information was received in last. If the elapsed time exceeds a threshold value, that is, if there is driving information for which the update is delayed, the vehicle map generating unit 220 removes the delayed driving information in a step S215, and then generates the vehicle map in a step S216.

Herein, whether there is the driving information for which the update is delayed may be determined in various ways. For example, if the product of speed of the vehicle and the elapsed time without being updated, that is, a distance that the vehicle has traveled without being updated is equal to or greater than a predetermined threshold value, it may be determined that it is the driving information for which the updated is delayed. Alternatively, if the speed of the vehicle is zero, it may be determined that it is the driving information for which the updated is delayed if the elapsed time without being updated is equal to or greater than a predetermined threshold value. However, it is just an example to determine whether there is the driving information for which the update is delayed.

The vehicle map extracting unit 230 extracts a vehicle map to be transmitted to each of a plurality of vehicles from the vehicle map generated by the vehicle map generating unit 220. The extracted vehicle map may be transmitted to a corresponding vehicle through the communication unit 210. In this case, the vehicle map to be transmitted to each of the plurality of vehicles may refer to a vehicle map including driving information for the corresponding vehicle or driving information for a surrounding vehicle on a route of the corresponding vehicle.

In addition, since the driving information received from a plurality of vehicles by using the communication unit 210 is driving information at the time when each of the plurality of vehicles generates the driving information, driving information of a vehicle at the time at which each step is performed may be predicted to provide in order for the vehicle map generating unit 220 to generate a vehicle map or in order for the vehicle map extracting unit 230 to extract a vehicle map to be transmitted to each vehicle.

Therefore, the vehicle map to be transmitted to each of the plurality of the vehicles may include driving information for the surrounding vehicle on the route of the corresponding vehicle or driving information of the corresponding vehicle predicted based on the time at which a vehicle map is generated or extracted based on driving information at the time at which each of the plurality of the vehicles generates the driving information.

In other words, according to an embodiment, even if there is a vehicle that does not have a module supporting a communication function such as V2V or V2I, a vehicle map including driving information for the vehicle that does not have the module may be provided to another vehicle or another driver. In addition, a vehicle map including driving information for a surrounding vehicle that is not detected by its own vehicle may be provided to the corresponding vehicle. Therefore, a driving assistance service may be quickly, accurately, and actively provided to each vehicle.

As described above, the driving information providing apparatus 100 of a vehicle that received the generated vehicle map may predict driving information for the own vehicle and the surrounding vehicle. Specifically, the driving assistance service providing unit 150 of the driving information providing apparatus 100 may predict the driving information for the own vehicle and the surrounding vehicle based on the vehicle map received from the vehicle map providing server 200.

In addition, if a difference between the driving information predicted for the own vehicle and the surrounding vehicle, and the driving information estimated by the own vehicle is greater than or equal to a threshold value, the driving assistance service providing unit 150 may correct the predicted driving information through matching between the predicted driving information and actual driving information. Herein, the driving information estimated by the own vehicle may indicate driving information obtained by the own vehicle driving information obtaining unit 120 and the surrounding vehicle driving information calculating unit 140.

The driving assistance service providing unit 150 may perform matching between surrounding vehicles through a result of recognizing a license plate number, or extraction of image feature points in a vehicle area and a descriptor and matching in the same method performed by the vehicle map providing server 200. After the matching is performed, the driving assistance service providing unit 150 may obtain a matching error for surrounding vehicles and the own vehicle, and may correct driving information predicted by using an average of the matching errors. Specifically, the driving assistance service providing unit 150 may correct the predicted driving information according to Equation 10.

$$\Delta x = \frac{1}{n}\sum_{i=1}^{n} x_{i@vehicle} - x_{i@server}$$

-continued $$\Delta y = \frac{1}{n}\sum_{i=1}^{n} y_{i@vehicle} - y_{i@server} \qquad \text{Equation 10}$$

Herein, if n number of corresponding vehicles are given, $x_{i@vehicle}$ and $y_{i@vehicle}$ may refer to coordinates indicating a position of a vehicle estimated by the own vehicle, and $x_{i@server}$ and $y_{i@server}$ may refer to coordinates indicating a position of a vehicle predicted from a vehicle map provided by the vehicle providing server 200. Further, x and y may indicate values for correcting the predicted position of the vehicle, and the driving assistance service providing unit 150 may correct the predicted position of the vehicle as $x_{i@server+x}$ and $y_{i@server+y}$.

At this time, if an error between the correction result according to Equation 10 and the driving information estimated by the own vehicle is less than or equal to a threshold value, the driving assistance service providing unit 150 determines that it is a situation in which a position of the surrounding vehicle may be predicted.

On the other hand, if overlapping data occurs between the driving information for the surrounding vehicle predicted by the vehicle map and the driving information for the surrounding vehicle estimated by the own vehicle, the driving assistance service providing unit 150 according to an embodiment may select the driving information for the surrounding vehicle by using an error of covariance for the driving information for the surrounding vehicle.

Specifically, the driving assistance service providing unit 150 may predict a covariance indicating an estimation error for an absolute position/direction of the surrounding vehicle according to Equation 7. Herein, the covariance for the absolute position/direction $[x_a, y_a, \theta_a]$ of the surrounding vehicle may be in a form of a 3×3 matrix.

At this time, if variance for a position among diagonal components is Cxs and Cys, the driving assistance service providing unit 150 may select, as the position of the surrounding vehicle, a smaller value among a (Cxs+Cys) value for the position of the surrounding vehicle predicted based on the vehicle map and a (Cxs+Cys) value for the position of the surrounding vehicle estimated by the own vehicle.

Alternatively, if overlapping data occurs, the driving assistance service providing unit 150 according to another embodiment may select the driving information for the surrounding vehicle by applying the Kalman filter to the driving information for the surrounding vehicle estimated by the own vehicle and the driving information for the surrounding vehicle predicted based on the vehicle map. Specifically, the driving assistance service providing unit 150 may obtain the position/direction $P_{estimated}$ of the surrounding vehicle according to Equation 11.

$$P_{estimated} = (C_s + C_v)^{-1}(C_v^{-1}P_s + C_s^{-1}P_v) \qquad \text{Equation 11}$$

Herein, $P_s$ indicates the position/direction of the surrounding vehicle predicted based on the vehicle map, $P_v$ indicates the position/direction of the surrounding vehicle estimated by the own vehicle, and $C_s$ and $C_v$ indicate covariance matrices for $P_s$ and $P_v$, respectively.

Figure 15:
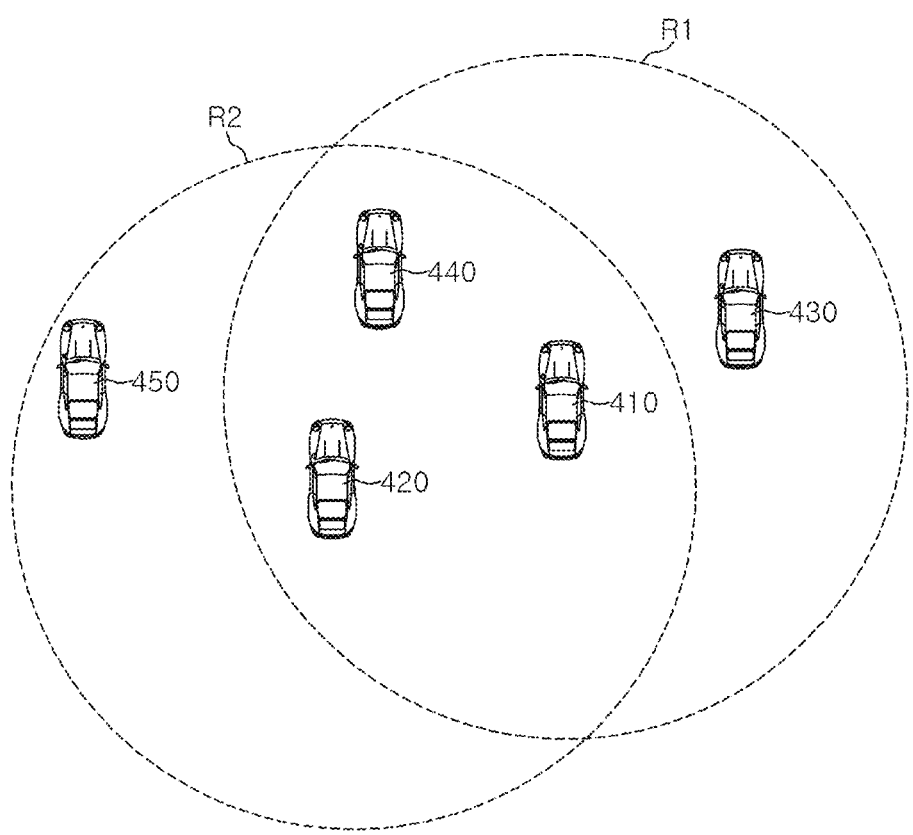
FIG. 15 shows a diagram illustrating a method in which its own vehicle shares driving information with surrounding vehicles in an environment in which a vehicle map providing server does not exist according to an embodiment.

FIG. 15 shows a diagram illustrating a method in which its own vehicle shares driving information with surrounding vehicles in an environment in which the vehicle map providing server 200 does not exist according to an embodiment.

Referring to FIG. 15, a first vehicle 410, a second vehicle 420, and a third vehicle 430 may be vehicles equipped with the driving information providing apparatus 100.

In an environment without the vehicle map providing server 200, the first vehicle 410 may transmit and receive, with the second vehicle 420, the third vehicle 430, and the fourth vehicle 440 which are driving or positioned within a first area R1, driving information of each of the second vehicle 420, the third vehicle 430, and the fourth vehicle 440, and driving information for a surrounding vehicle around each of the second vehicle 420, the third vehicle 430, and the fourth vehicle 440

Herein, the first area R1 may indicate an area around the first vehicle 410 in which the first vehicle 410 intends to transmit and receive driving information with surrounding vehicles. A size, shape, or the like of the first area R1 may be changed according to embodiments.

In addition, the environment without the vehicle map providing server 200 indicates a case in which a vehicle equipped with the driving information providing apparatus 100 is temporarily or (semi)permanently impossible to communicate with the vehicle map providing server 200, or a case in which the vehicle map providing server 200 does not exist.

The first vehicle 410, through the method described with reference to FIGS. 2 and 3, may transmit, to the third vehicle 430 and the fourth vehicle 440, a first image captured by the first vehicle 410 itself, driving information of the first vehicle 410 itself, and driving information for the third vehicle 430 and the fourth vehicle 440 on the first image.

In more detail, the first vehicle 410 may obtain own driving information of the first vehicle 410 itself by using the own vehicle driving information obtaining unit 120 included in the driving information providing apparatus 100 mounted on the first vehicle 410. The own vehicle driving information may include at least one of position information, attitude angle information, traveling direction information, speed information, time information of obtaining driving information, and an identifier of the first vehicle 410.

In addition, the first vehicle 410 may detect the third vehicle 430 and the fourth vehicle 440 on the first image by using the surrounding vehicle detecting unit 130 included in the driving information providing apparatus 100 mounted on the first vehicle 410. In FIG. 15, for convenience of description, it is described that the first vehicle 410 captures forward based on a traveling direction of the first vehicle 410, but is not limited thereto. In other words, if the first vehicle 410 captures sideways or rearward, a vehicle that is traveling or positioned in the corresponding direction may also be detected, and a surrounding vehicle may be detected by using not only the captured image but also a sensor detecting a vehicle that is traveling or is not moving around the own vehicle. You can also use sensors to detect nearby vehicles.

The first vehicle 410 may calculate surrounding vehicle driving information for each of the third vehicle 430 and the fourth vehicle 440 by using the surrounding vehicle driving information calculating unit 140 included in the driving information providing apparatus 100 mounted on the first vehicle 410. The surrounding vehicle driving information may include at least one of position information, attitude angle information, traveling direction information, speed information, time information of obtaining driving information, and an identifier of each of the third vehicle 430 and the fourth vehicle 440.

The first vehicle 410 may generate a vehicle map of the first area R1 or an area wider than the first area R1 by using the own vehicle driving information and the surrounding vehicle driving information for each of the third vehicle 430 and the fourth vehicle 440. Herein, the area wider than the first area R1 may indicate an area including not only the first area R1 but also a part of areas of surrounding vehicles that are traveling or positioned within the first area R1.

The vehicle map may include the own driving information of the first vehicle 410 and the surrounding vehicle driving information for each of the third vehicle 430 and the fourth vehicle 440, respectively. In other words, the vehicle map may display position information, traveling direction information, speed information, time information of obtaining driving information, and identifiers of the first vehicle 410, and the third vehicle 430 and the fourth vehicle 440 that are traveling or positioned around the first vehicle 410.

The first vehicle 410 may transmit the vehicle map to the third vehicle 430 and the fourth vehicle 440. The first vehicle 410 may receive the vehicle map generated by each of the third vehicle 430 and the fourth vehicle 440 from the third vehicle 430 and the fourth vehicle 440.

At this time, the first vehicle 410 may receive, from the second vehicle 420, a vehicle map including own vehicle driving information of the second vehicle 420, and surrounding vehicle driving information for each of the first vehicle 410, the fourth vehicle 440, and the fifth vehicle 450. The first vehicle 410 may recognize that the second vehicle 420 is driving or is positioned around the first vehicle 410 itself through the received vehicle map.

The first vehicle 410 may update the vehicle map generated by the first vehicle 410 itself by using the vehicle maps received from the second vehicle 420, the third vehicle 430, and the fourth vehicle 440, and may transmit the updated vehicle map to the second vehicle 420, the third vehicle 430, and the fourth vehicle 440. The updated vehicle map may include not only driving information for the third vehicle 430 and the fourth vehicle 440, but also driving information for the second vehicle 420 and the fifth vehicle 450 received from the second vehicle 420.

Similar to the first vehicle 410, the second vehicle 420 may transmit the vehicle map generated by the second vehicle 420 to the first vehicle 410, the fourth vehicle 440, and the fifth vehicle 450 which are driving or positioned in a second area R2 and with which the second vehicle 420 intends to transmit and receive driving information. Further, the second vehicle 420 may receive the vehicle map generated by each of the first vehicle 410, the fourth vehicle 440, and the fifth vehicle 450 from each of the first vehicle 410, the fourth vehicle 440, and the fifth vehicle 450, may update the vehicle map generated by the second vehicle 420 itself by using the received vehicle map, and may transmit the updated vehicle map to the first vehicle 410, the fourth vehicle 440, and the fifth vehicle 450.

Through the above-described process, the first vehicle 410 may obtain driving information of the second vehicle 420 traveling or positioned around the first vehicle 410 although the first vehicle 410 itself did not detect the second vehicle 420, and may obtain driving information of the fifth vehicle 450 within the second area R2 although the fifth vehicle 450 is not positioned in the first area R1. Accordingly, the vehicle map of the first vehicle 410 may further include the driving information of the second vehicle 420 and the fifth vehicle 450. Therefore, the first vehicle 410 may generate a vehicle map for an area wider than the first area R1.

According to an embodiment, the first vehicle 410 was unable to communicate with the vehicle map providing server 200, but thereafter the first vehicle 410 moved to a communication available area, or the driving information providing apparatus 100 or the vehicle map providing server 200 are repaired, thereby enabling communication between the first vehicle 410 and the vehicle map providing server 200 again. In this case, the first vehicle 410 may transmit, to the vehicle map providing server 200, the vehicle map, or the own vehicle driving information and the surrounding vehicle driving information which are most recently generated or updated.

In addition, a method in which the vehicle map providing server 200 manages driving information of the own vehicle and the surrounding vehicle described with reference to FIGS. 5 through 14 may be identically applied to the first vehicle 410 in an environment without the vehicle map providing server 200.

However, while the vehicle map providing server 200 manages driving information in a wide area, the first vehicle 410 manages driving information in the first area R1 or in an area wider than the first area R1, and the first vehicle 410 generates or updates a vehicle map separately from the second vehicle 420 through the fifth vehicle 450, so that sharing of identifiers between the vehicles may not be of great significance. Therefore, according to an embodiment, the first vehicle 410 in the environment without the vehicle map providing server 200 may not perform functions of determining whether the vehicles are identical by using the identifier, and collecting driving information for each vehicle based on the identifier.

Figure 16:
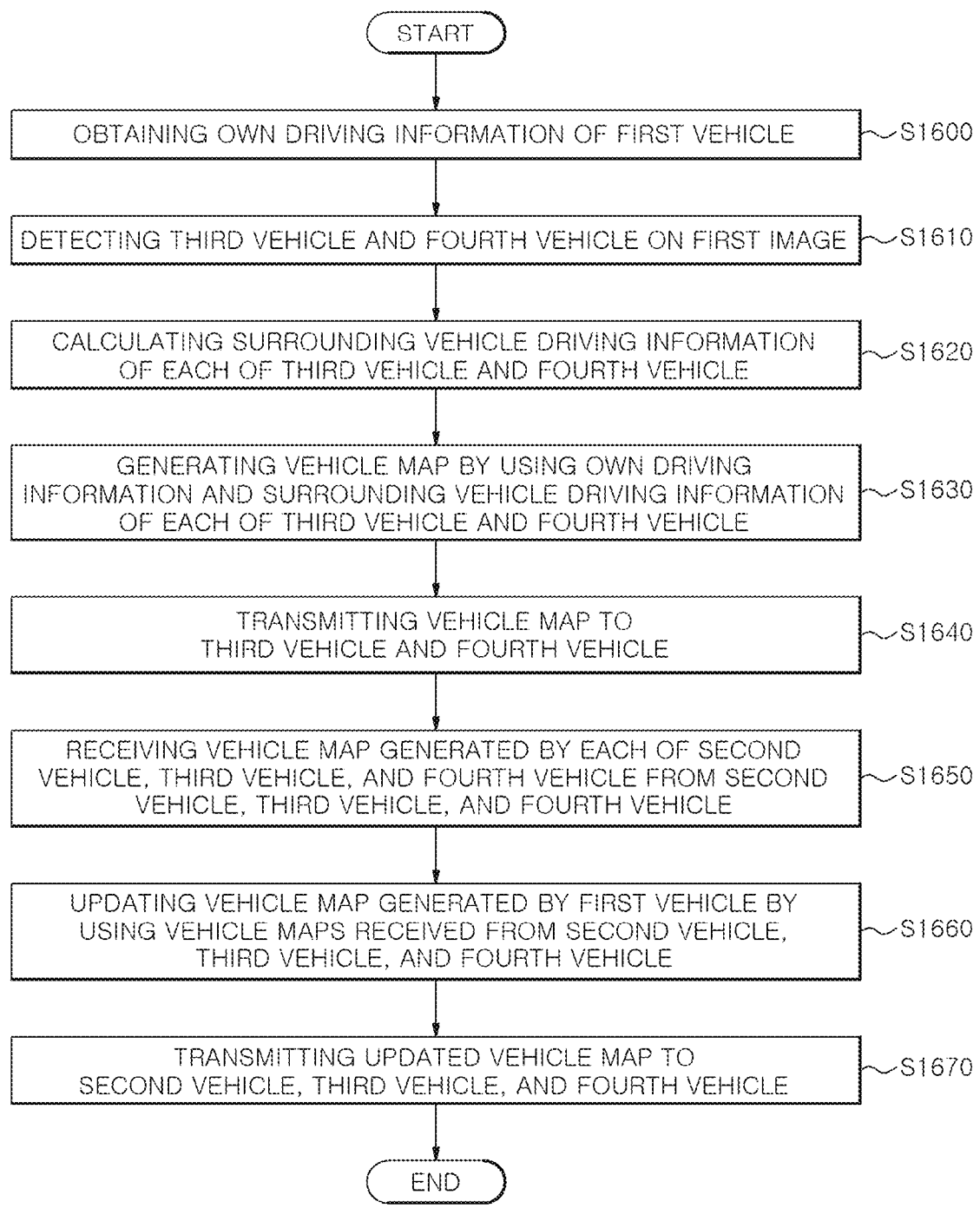
FIG. 16 shows a flowchart illustrating a method in which its own vehicle shares driving information with surrounding vehicles in an environment in which a vehicle map providing server does not exist according to an embodiment.

FIG. 16 shows a flowchart illustrating a method in which its own vehicle shares driving information with surrounding vehicles in an environment in which the vehicle map providing server 200 does not exist according to an embodiment.

Referring to FIGS. 15 and 16, in a step S1600, the first vehicle 410 may obtain own vehicle driving information of the first vehicle 410 itself by using the own vehicle driving information obtaining unit 120 included in the driving information providing apparatus 100 mounted on the first vehicle 410.

In a step S1610, the first vehicle 410 may detect the third vehicle 430 and the fourth vehicle 440 on a first image captured by the first vehicle 410 by using the surrounding vehicle detecting unit 130 included in the driving information providing apparatus 100 mounted on the first vehicle 410.

In a step S1620, the first vehicle 410 may calculate surrounding vehicle driving information for each of the third vehicle 430 and the fourth vehicle 440 by using the surrounding vehicle driving information calculating unit 140 included in the driving information providing apparatus 100 mounted on the first vehicle 410.

In a step S1630, the first vehicle 410 may generate a vehicle map by using the own vehicle driving information and the surrounding vehicle driving information for each of the third vehicle 430 and the fourth vehicle 440.

In a step S1640, the first vehicle 410 may transmit the vehicle map to the third vehicle 430 and the fourth vehicle 440.

In a step S1650, the first vehicle 410 may receive vehicle maps generated by each of the third vehicle 430 and the fourth vehicle 440 from the third vehicle 430 and the fourth vehicle 440, and may receive, from the second vehicle 420, own driving information of the second vehicle 420, and surrounding vehicle driving information for each of the first vehicle 410, the fourth vehicle 440, and the fifth vehicle 450.

In a step S1660, the first vehicle 410 may update the vehicle map generated by the first vehicle 410 itself by using the vehicle maps received from the second vehicle 420, the third vehicle 430, and the fourth vehicle 440. In a step S1670, the first vehicle 410 may transmit the updated vehicle map to the second vehicle 420, the third vehicle 430, and the fourth vehicle 440.

On the other hand, each of the driving information providing method and the vehicle map providing method according to an embodiment may be implemented in a form of a computer program that is programmed to execute each step included therein and stored in a computer-readable recording medium.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

According to an embodiment, the driving information providing method, the vehicle map providing server 200 and the vehicle map providing method described above may be used in various fields such as a home, an industrial site, or the like, thereby having industrial applicability.

What is claimed is:

1. A vehicle map providing method performed by a vehicle map providing server, the method comprising:

receiving, from a first vehicle, first information including a first image captured by the first vehicle, first driving information of the first vehicle, and second driving information of a second vehicle in the first image at a first time;

receiving, from a third vehicle, second information including a second image captured by the third vehicle, third driving information of the third vehicle, and fourth driving information of a fourth vehicle in the second image at a second time;

analyzing the received second driving information and the received fourth driving information to determine whether a license plate number is included in the second driving information received at the first time and a license plate number of the fourth vehicle is included in the fourth driving information received at the second time;

responsive to determining that the license plate number of the second vehicle is included in the second driving information and the license plate number of the fourth vehicle is included in the fourth driving information as a result of analyzing the received second driving information and the received fourth driving information, further collecting the second driving information at a third time subsequent to the first time and the fourth driving information at a fourth time subsequent to the second time based on the license plate number of the second vehicle and the license plate number of the fourth vehicle;

responsive to determining that the license plate number of the second vehicle is not included in the second driving information or the license plate number of the fourth vehicle is not included in the fourth driving information as a result of analyzing the received second driving information and the received fourth driving information, further collecting the second driving information collected at the third time and the fourth driving information collected at the fourth time based on position information and an attitude angle of the second vehicle or position information and an attitude angle of the fourth vehicle;

determining whether the second vehicle is the same as the fourth vehicle by at least:

responsive to the license plate number of the second vehicle being included in the second driving information collected at the third time and the license plate number of the fourth vehicle being included in the fourth driving information collected at the fourth time, comparing the license plate number of the second vehicle included in the second driving information collected at the third time with the license plate number of the fourth vehicle included in the fourth driving information collected at the fourth time by using a machine learning model that is trained by receiving a plurality of training images, for each of a plurality of vehicle models of different sizes but without using the position information and the attitude angle included in the second driving information collected at the second time and the position information and the attitude angle included in the fourth driving information collected at the fourth time, determining whether the second vehicle is the same as the fourth vehicle based on a result of the comparison, and responsive to the license plate number of the second vehicle not being included in the second driving information collected at the third time or the license plate number of the fourth vehicle not being included in the fourth driving information collected at the fourth time, determining whether the second vehicle is the same as the fourth vehicle by using the position information and the attitude angle of the second vehicle included in the second driving information collected at the third time, and the position information and the attitude angle of the fourth vehicle included in the fourth driving information collected at the fourth time;

generating, according to whether the second vehicle is the same as the fourth vehicle, a vehicle map indicating at least a speed and a traveling direction of each of vehicles by using the first driving information and the third driving information, and at least one of the second driving information collected at the third time and the fourth driving information collected at the fourth time;

predicting, from the vehicle map, a first vehicle map including driving information for one or more vehicles on a route of the first vehicle at a current time subsequent to the third time and the first time based on the first driving information;

transmitting the first vehicle map to the first vehicle to cause the first vehicle to correct the driving information in the predicted first vehicle map by comparing the driving information in the predicted first vehicle information with actual driving information determined by the first vehicle at the current time; and controlling the first vehicle based on the driving information corrected by comparing the driving information in the predicted first vehicle information with actual driving information determined by the first vehicle at the current time.

2. The method of claim 1, wherein the vehicle map is generated using the second driving information responsive to the third time being later than the fourth time or using the the fourth driving information responsive to the fourth time being later than the third time.

3. The method of claim 1, wherein the determining whether the second vehicle is the same as the fourth vehicle further includes:
   extracting first feature points for the second vehicle in the first image;
   extracting second feature points for the fourth vehicle in the second image; and
   determining whether the second vehicle is the same as the fourth vehicle based on whether the first feature points match the second feature points.

4. The method of claim 3, wherein the second vehicle is determined to be the same as the fourth vehicle if the first feature points match the second feature points and a distance between the second vehicle and the fourth vehicle is less than or equal to a threshold value.

5. The method of claim 4, wherein the distance is a Mahalanobis distance.

6. A vehicle map providing method performed by a first vehicle on which a driving information providing apparatus is mounted, the method comprising:
   receiving, from a second vehicle positioned around the first vehicle, first information including a first image captured by the second vehicle, first own vehicle driving information of the second vehicle, and first surrounding vehicle driving information for a third vehicle in the first image at a first time;
   receiving, from a fourth vehicle positioned around the first vehicle, second information including a second image captured by the fourth vehicle, second own vehicle driving information of the fourth vehicle, and second surrounding vehicle driving information for a fifth vehicle in the second image at a second time;
   analyzing the received first surrounding vehicle driving information and the received second surrounding vehicle driving information to determine whether a license plate number of the third vehicle is included in the first surrounding vehicle driving information collected at the first time and a license plate number of the fifth vehicle is included in the second surrounding vehicle driving information collected at the second time;
   responsive to determining that the license plate number of the third vehicle is included in the first surrounding vehicle driving information received at the first time and the license plate number of the fifth vehicle is included in the second surrounding vehicle driving information received at the second time as a result of analyzing the received first surrounding vehicle driving information and the received second surrounding vehicle driving information, further collecting the first surrounding vehicle driving information received at a third time subsequent to the first time and the second surrounding vehicle driving information received at a fourth time subsequent to the second time based on the license plate number of the third vehicle and the license plate number of the fifth vehicle without using position information and attitude information included in the first surrounding vehicle information at the third time and position information and attitude information included in the second surrounding information at the fourth time;
   responsive to determining that the license plate number of the third vehicle is not included in the first surrounding vehicle driving information received at the first time or the license plate number of the fifth vehicle not being included in the second surrounding vehicle driving information received at the second time as a result of analyzing the received first surrounding vehicle driving information and the received second surrounding vehicle driving information, further collecting the first surrounding vehicle driving information collected at the third time and the second surrounding vehicle driving information collected at the fourth time based on position information and an attitude angle of the third vehicle or position information and an attitude angle of the fifth vehicle;
   determining whether the third vehicle is the same as the fifth vehicle by at least:
      responsive to the license plate number of the third vehicle being included in the first surrounding vehicle information collected at the third time and the license plate number of the fifth vehicle being included in the second surrounding vehicle information collected at the fourth time, comparing the license plate number of the third vehicle included in the first surrounding vehicle driving information at the third time with the license plate number of the fifth vehicle included in the second surrounding vehicle driving information at the fourth time;
      determining whether the third vehicle is the same as the fifth vehicle based on a result of the comparison; and
      responsive to the license plate number of the third vehicle not being included in the first surrounding vehicle driving information collected at the third time or the license plate number of the fifth vehicle not being included in the second surrounding vehicle driving information collected at the fourth time, determining whether the third vehicle is the same as the fifth vehicle by using the position information and the attitude angle of the third vehicle included in the first surrounding vehicle driving information collected at the third time, and the position information and the attitude angle of the fifth vehicle included in the second surrounding vehicle driving information collected at the fourth time; and
   generating, according to whether the third vehicle is the same as the fifth vehicle, a vehicle map indicating at least a speed and a traveling direction of each of vehicles at a current time subsequent to the third time and the fourth time by using the first own vehicle driving information and the second own vehicle driving information, and at least one of the first surrounding vehicle driving information collected at the third time and the second surrounding vehicle driving information collected at the fourth time;
   receiving a predicted vehicle map from a vehicle map providing server, the predicted vehicle map including driving information predicted for one or more vehicles on a route of the first vehicle at the current time;
   correcting the predicted vehicle map by comparing the driving information in the predicted first vehicle information with the vehicle map at the current time; and
   controlling the first vehicle based on the predicted vehicle map corrected by comparing the driving information in the predicted first vehicle information with the vehicle map at the current time.

7. The method of claim 6, wherein the vehicle map is generated using using the first surrounding vehicle driving information responsive to the third time being later than the fourth time or using the second surrounding vehicle driving information responsive to the fourth time being later than the third time.

8. The method of claim 6, wherein the determining whether the third vehicle is the same as the fifth vehicle includes:
   extracting first feature points for the third vehicle in the first image;
   extracting second feature points for the fifth vehicle in the second image; and
   determining whether the third vehicle is the same as the fifth vehicle based on whether the first feature points match the second feature points.

9. The method of claim 8, wherein the third vehicle is determined to be the same as the fifth vehicle if the first feature points match the second feature points and a distance between the third vehicle and the fifth vehicle is less than or equal to a threshold value.

10. A non-transitory computer-readable storage medium including computer executable instructions, wherein the instructions, when executed by a processor, cause the processor to perform a vehicle map providing method, the method comprising:
   receiving, from a first vehicle, first information including a first image captured by the first vehicle, first driving information of the first vehicle, and second driving information of a second vehicle in the first image at a first time;
   receiving, from a third vehicle, second information including a second image captured by the third vehicle, third driving information of the third vehicle, and fourth driving information of a fourth vehicle in the second image at a second time;
   analyzing the received second driving information and the received fourth driving information to determine whether a license plate number of the second vehicle is included in the received second driving information at the first time and a license plate number of the fourth vehicle is included in the received fourth driving information at the second time;
   responsive to determining that the license plate number of the second vehicle is included in the second driving information and the license plate number of the fourth vehicle is included in the fourth driving information as a result of analyzing the received second driving information and the received fourth driving information, further collecting the second driving information at a third time subsequent to the first time and the fourth driving information of a fourth time subsequent to the second time based on the license plate number of the second vehicle and the license plate number of the fourth vehicle;
   responsive to determining that the license plate number of the second vehicle is not included in the second driving information or the license plate number of the fourth vehicle is not included in the fourth driving information as a result of analyzing the received second driving information and the received fourth driving information, further collecting the second driving information at the third time and the fourth driving information at the fourth time based on position information and an attitude angle of the second vehicle or position information and an attitude angle of the fourth vehicle;
   determining whether the second vehicle is the same as the fourth vehicle by at least:
      responsive to the license plate number of the second vehicle being included in the second driving information at the third time and the license plate number of the fourth vehicle being included in the fourth driving information at the fourth time, comparing the license plate number of the second vehicle included in the second driving information at the third time with the license plate number of the fourth vehicle included in the fourth driving information at the fourth time by using a machine learning model that is trained by receiving a plurality of training images, for each of a plurality of vehicle models of different sizes but without using the position information and the attitude angle included in the second driving information of the second time and the position information and the attitude angle included in the fourth driving information at the fourth time,
      determining whether the second vehicle is the same as the fourth vehicle based on a result of the comparison, and
      responsive to the license plate number of the second vehicle not being included in the second driving information at the third time or the license plate number of the fourth vehicle not being included in the fourth driving information at the fourth time, determining whether the second vehicle is the same as the fourth vehicle by using the position information and the attitude angle of the second vehicle included in the second driving information at the third time, and the position information and the attitude angle of the fourth vehicle included in the fourth driving information at the fourth time;
   generating, according to whether the second vehicle is the same as the fourth vehicle, a vehicle map indicating at least a speed and a traveling direction of each of vehicles by using the first driving information and the third driving information, and at least one of the second driving information at the third time and the fourth driving information at the fourth time;
   predicting, from the vehicle map, a first vehicle map including driving information for one or more vehicles on a route of the first vehicle at a current time subsequent to the third time and the first time based on the first driving information;
   transmitting the first vehicle map to the first vehicle to cause the first vehicle to correct the driving information in the predicted first vehicle map by comparing the driving information in the predicted first vehicle information with actual driving information determined by the first vehicle at the current time; and
   controlling the first vehicle based on the driving information corrected by comparing the driving information in the predicted first vehicle information with actual driving information determined by the first vehicle at the current time.

11. The non-transitory computer-readable storage medium of claim 10, wherein the vehicle map is generated using the second driving information responsive to the third time being later than the fourth time or using the the fourth driving information responsive to the fourth time being later than the third time.

12. The non-transitory computer-readable storage medium of claim 10, wherein the determining whether the second vehicle is the same as the fourth vehicle includes:
   extracting first feature points for the second vehicle in the first image;
   extracting second feature points for the fourth vehicle in the second image; and determining whether the second vehicle is the same as the fourth vehicle based on whether the first feature points match the second feature points.

* * * * *